US008161747B2

(12) United States Patent
Pierpont et al.

(10) Patent No.: US 8,161,747 B2
(45) Date of Patent: Apr. 24, 2012

(54) EXHAUST SYSTEM HAVING SERIES TURBOCHARGERS AND EGR

(75) Inventors: David Andrew Pierpont, Dunlap, IL (US); John Parker Timmons, Chillicothe, IL (US); William L. Easley, Jr., Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 757 days.

(21) Appl. No.: 12/222,011

(22) Filed: Jul. 31, 2008

(65) Prior Publication Data

US 2010/0024419 A1    Feb. 4, 2010

(51) Int. Cl.
*F02B 33/44* (2006.01)
*F02D 23/00* (2006.01)
(52) U.S. Cl. .............................. 60/605.2; 60/602; 60/612
(58) Field of Classification Search ................. 60/605.2, 60/602, 612; 137/625.44
See application file for complete search history.

(56) References Cited

U.S. PATENT DOCUMENTS

| | | | |
|---|---|---|---|
| 3,423,926 A | 1/1969 | Nancarrow et al. | |
| 3,559,397 A | 2/1971 | Navarro | |
| 4,177,006 A | 12/1979 | Nancarrow | |
| 4,179,892 A | 12/1979 | Heydrich | |
| 4,474,006 A | 10/1984 | Price et al. | |
| 4,526,004 A | 7/1985 | French et al. | |
| 4,544,326 A | 10/1985 | Nishiguchi et al. | |
| 4,611,465 A | 9/1986 | Kato et al. | |
| 4,982,567 A * | 1/1991 | Hashimoto et al. | 60/612 |
| 5,020,327 A * | 6/1991 | Tashima et al. | 60/612 |
| 5,069,194 A | 12/1991 | Deutschmann et al. | |
| 5,146,754 A | 9/1992 | Jain et al. | |
| 5,611,202 A | 3/1997 | Sumser et al. | |
| 5,611,203 A | 3/1997 | Henderson et al. | |
| 5,740,785 A | 4/1998 | Dickey et al. | |
| 5,791,146 A | 8/1998 | Dungner | |
| 5,794,445 A | 8/1998 | Dungner | |
| 5,943,864 A | 8/1999 | Sumser et al. | |
| 6,216,459 B1 | 4/2001 | Daudel et al. | |
| 6,223,534 B1 | 5/2001 | Erdmann et al. | |
| 6,237,335 B1 | 5/2001 | Lönnqvist | |
| 6,269,643 B1 | 8/2001 | Schmidt et al. | |
| 6,286,312 B1 | 9/2001 | Bertilsson | |
| 6,321,537 B1 | 11/2001 | Coleman et al. | |
| 6,324,847 B1 | 12/2001 | Pierpont | |
| 6,412,279 B1 | 7/2002 | Coleman et al. | |
| 6,418,721 B1 | 7/2002 | Coleman et al. | |
| 6,422,222 B1 | 7/2002 | Arbeiter et al. | |
| 6,460,519 B1 | 10/2002 | Pierpont | |
| 6,470,864 B2 | 10/2002 | Kim et al. | |
| 6,484,499 B2 | 11/2002 | Coleman et al. | |
| 6,672,061 B2 | 1/2004 | Schmid et al. | |
| 6,675,782 B1 | 1/2004 | Persson | |
| 6,694,735 B2 | 2/2004 | Sumser et al. | |
| 6,715,288 B1 | 4/2004 | Engels et al. | |
| 6,715,289 B2 | 4/2004 | Mader et al. | |

(Continued)

*Primary Examiner* — Mary A Davis

(74) *Attorney, Agent, or Firm* — Finnegan, Henderson, Farabow, Garrett & Dunner LLP

(57) ABSTRACT

An exhaust system for a use with a combustion engine is provided. The exhaust system may have a first exhaust manifold configured to receive exhaust from the engine, a second exhaust manifold configured to receive exhaust from the engine in parallel with the first exhaust manifold, and an exhaust gas recirculation circuit in fluid communication with only the first exhaust manifold. The exhaust system may also have a first turbocharger having dual volutes configured to simultaneously receive exhaust from the first exhaust manifold and the second exhaust manifold, and a second turbocharger configured to receive exhaust from the first turbocharger and compress air directed into the engine.

16 Claims, 2 Drawing Sheets

U.S. PATENT DOCUMENTS

| | | |
|---|---|---|
| 6,751,956 B2 | 6/2004 | Mayer et al. |
| 6,871,642 B1 | 3/2005 | Osterwald |
| 6,877,492 B1 | 4/2005 | Osterwald |
| 6,918,251 B2 * | 7/2005 | Yanagisawa et al. ........ 60/605.2 |
| 6,973,787 B2 * | 12/2005 | Klingel ........................... 60/612 |
| 7,013,879 B2 | 3/2006 | Brookshire et al. |
| 7,043,913 B2 | 5/2006 | Nishiyama et al. |
| 7,051,527 B2 | 5/2006 | Schmid et al. |
| 7,165,403 B2 | 1/2007 | Sun et al. |
| 7,165,540 B2 | 1/2007 | Brookshire et al. |
| 7,222,614 B2 | 5/2007 | Bryant |
| 7,287,378 B2 | 10/2007 | Chen et al. |
| 2004/0074480 A1 | 4/2004 | Chen et al. |
| 2005/0103013 A1 | 5/2005 | Brookshire et al. |
| 2006/0060173 A1 | 3/2006 | Wei et al. |
| 2006/0070382 A1 | 4/2006 | Karlsson |
| 2006/0123785 A1 | 6/2006 | Sundin et al. |
| 2006/0123787 A1 | 6/2006 | Gobert et al. |
| 2006/0123788 A1 | 6/2006 | Gobert et al. |
| 2006/0174621 A1 | 8/2006 | Chen et al. |
| 2007/0028901 A1 | 2/2007 | Watakabe et al. |
| 2007/0107430 A1 * | 5/2007 | Schmid et al. .................. 60/612 |
| 2007/0119171 A1 | 5/2007 | Boyapati et al. |
| 2007/0175215 A1 | 8/2007 | Rowells |
| 2007/0193270 A1 | 8/2007 | Roozenboom et al. |
| 2007/0193564 A1 | 8/2007 | Takahashi et al. |
| 2008/0000228 A1 | 1/2008 | Kieser |
| 2008/0000229 A1 | 1/2008 | Kuspert et al. |
| 2009/0000296 A1 | 1/2009 | Pierpont et al. |

* cited by examiner

EXHAUST SYSTEM HAVING SERIES TURBOCHARGERS AND EGR

TECHNICAL FIELD

The present disclosure is directed to an exhaust system and, more particularly, to an exhaust system having series turbochargers and exhaust gas recirculation (EGR).

BACKGROUND

Combustion engines such as diesel engines, gasoline engines, and gaseous fuel-powered engines are supplied with a mixture of air and fuel for combustion within the engine that generates a mechanical power output. In order to maximize the power output generated by this combustion process, the engine is often equipped with a divided exhaust manifold in fluid communication with a turbocharged air induction system.

The divided exhaust manifold increases engine power by helping to preserve exhaust pulse energy generated by the engine's combustion chambers. Preserving the exhaust pulse energy improves turbocharger operation, which results in a more efficient use of fuel. In addition, the turbocharged air induction system increases engine power by forcing more air into the combustion chambers than would otherwise be possible. This increased amount of air allows for enhanced fueling that further increases the power output generated by the engine.

In addition to the goal of maximizing engine power output and efficiency, it is desirable to simultaneously minimize exhaust emissions. That is, combustion engines exhaust a complex mixture of air pollutants as byproducts of the combustion process. And, due to increased attention on the environment, exhaust emission standards have become more stringent. The amount of pollutants emitted to the atmosphere from an engine can be regulated depending on the type of engine, size of engine, and/or class of engine.

One method that has been implemented by engine manufacturers to comply with the regulation of these exhaust emissions includes utilizing an exhaust gas recirculating (EGR) system. EGR systems operate by recirculating a portion of the exhaust produced by the engine back to the intake of the engine to mix with fresh combustion air. The resulting mixture has a lower combustion temperature and, subsequently, produces a reduced amount of regulated pollutants.

EGR systems require a certain level of backpressure in the exhaust system to push a desired amount of exhaust back to the intake of the engine. And, the backpressure needed for adequate operation of the EGR system varies with engine load. Although effective, utilizing exhaust backpressure to drive EGR can adversely affect engine operation, thereby reducing fuel economy. Thus, a system is required that reduces exhaust backpressure, while still providing the necessary EGR flow.

U.S. Pat. No. 6,324,847 to Pierpont ("the '847 patent") discloses a combustion engine utilizing an EGR system and a divided exhaust manifold together with a turbocharged air induction system. Specifically, the '847 patent describes an internal combustion engine suitable for a vehicle and having a plurality of combustion cylinders. A first exhaust manifold and a second exhaust manifold are separately coupled with the plurality of combustion cylinders. The EGR system is disposed in fluid flow communication between the first exhaust manifold and an intake manifold of the engine. A turbocharger associated with the engine has a compressor with an inlet receiving combustion gas and an outlet in fluid flow communication with the intake manifold, and a turbine drivingly coupled to the compressor and having a turbine casing and a turbine wheel. The turbine casing defines separate first and second inlet paths for exhaust gas flow from the first and second exhaust manifolds. The engine is also provided with a valve for controlling the flow of exhaust gases through the EGR system, and a cooler located downstream of the valve to cool the exhaust gases. Efficiency and performance are improved by preserving pulse energy in one exhaust manifold flow, and increasing back pressure in the manifold providing EGR flow.

Although the system in the '847 patent may adequately control exhaust gas recirculation in a turbocharged engine, it may be less than optimal. Specifically, because the '847 patent provides only single-stage turbocharging, it may be applicable to only low-boost applications.

The disclosed exhaust system is directed to overcoming one or more of the problems set forth above and/or other problems of the prior art.

SUMMARY

In one aspect, the disclosure is directed toward an exhaust system for an engine. The exhaust system may include a first exhaust manifold configured to receive exhaust from the engine, a second exhaust manifold configured to receive exhaust from the engine in parallel with the first exhaust manifold, and an exhaust gas recirculation circuit in fluid communication with only the first exhaust manifold. The exhaust system may also include a first turbocharger having dual volutes configured to simultaneously receive exhaust from the first exhaust manifold and the second exhaust manifold, and a second turbocharger configured to receive exhaust from the first turbocharger and compress air directed into the engine.

In another aspect, the disclosure is directed toward a method of handling exhaust from an engine. The method may include receiving exhaust from a first plurality of combustion chambers, and receiving exhaust from a second plurality of combustion chambers. The method may also include directing a portion of the exhaust received from only the first plurality of combustion chambers back into the engine for subsequent combustion, removing energy from a remaining portion of the exhaust received from the first plurality of combustion chambers, and removing energy from the exhaust received from the second plurality of combustion chambers. The method may further include directing the remaining portion of the exhaust received from the first plurality of combustion chambers to mix with the exhaust received from the second plurality of combustion chambers to form a mixed exhaust, and removing energy from the mixed exhaust to pressurize air directed into the first and second plurality of combustion chambers.

DETAILED DESCRIPTION

Figure 1:
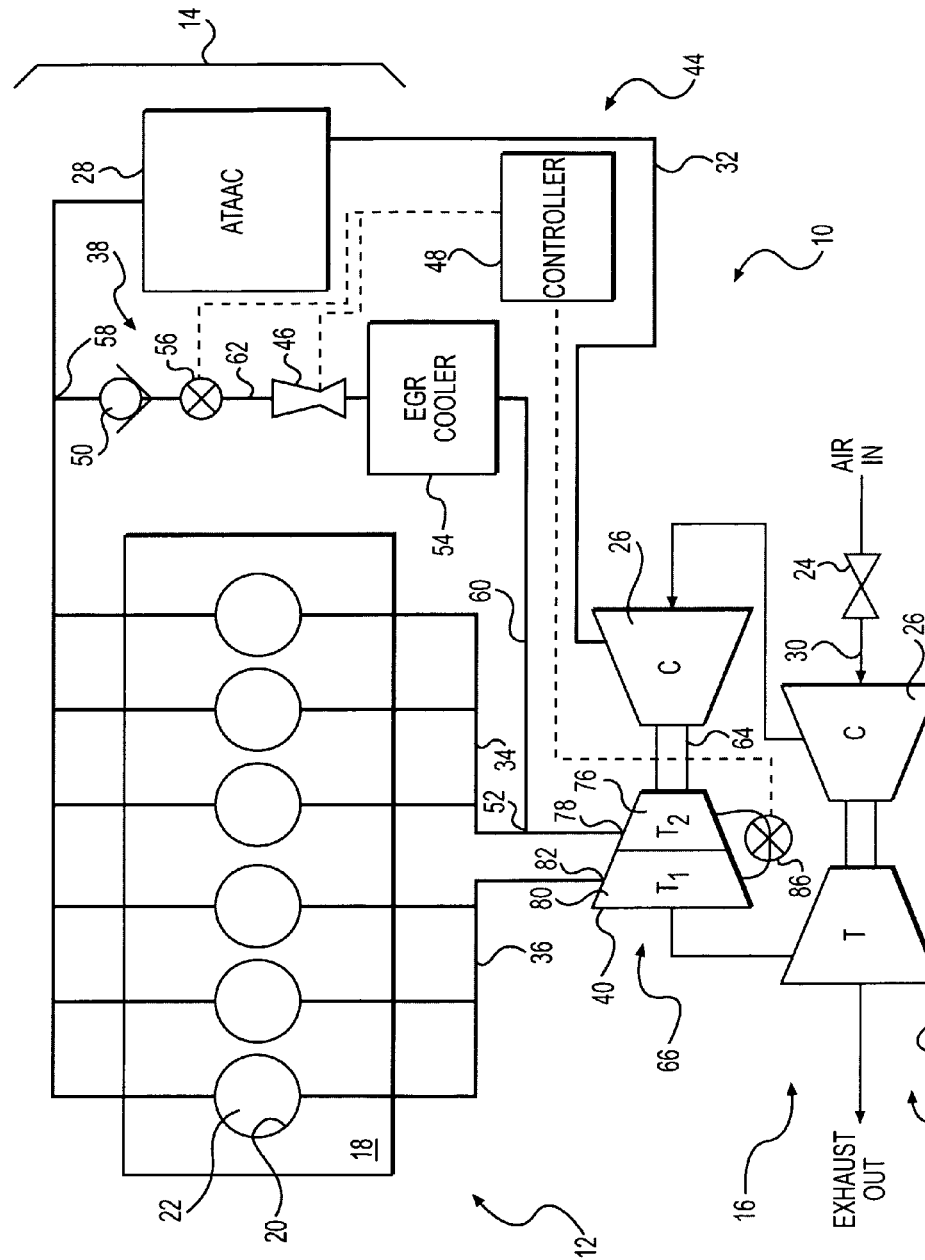
FIG. 1 is a schematic illustration of an exemplary disclosed power system.

FIG. 1 illustrates a power system 10 having a power source 12, an air induction system 14, and an exhaust system 16. For the purposes of this disclosure, power source 12 is depicted and described as a four-stroke diesel engine. One skilled in the art will recognize, however, that power source 12 may be any other type of combustion engine such as, for example, a gasoline or a gaseous fuel-powered engine. Power source 12 may include an engine block 18 that at least partially defines a plurality of cylinders 20. A piston (not shown) may be slidably disposed within each cylinder 20 to reciprocate between a top-dead-center position and a bottom-dead-center position, and a cylinder head (not shown) may be associated with each cylinder 20. Cylinder 20, the piston, and the cylinder head may form a combustion chamber 22. In the illustrated embodiment, power source 12 includes six such combustion chambers 22. However, it is contemplated that power source 12 may include a greater or lesser number of combustion chambers 22 and that combustion chambers 22 may be disposed in an "in-line" configuration, a "V" configuration, or in any other suitable configuration.

Air induction system 14 may include components configured to introduce charged air into power source 12. For example, air induction system 14 may include an induction valve 24, two or more compressors 26, and an air cooler 28. Induction valve 24 may be connected upstream of compressors 26 via a fluid passageway 30 and configured to regulate the flow of atmospheric air to power source 12. Each compressor 26 may embody a fixed geometry compressor, a variable geometry compressor, or any other type of compressor configured to receive air from induction valve 24 and compress the air to a predetermined pressure level before it enters power source 12. Compressors 26 may be disposed in a series relationship and connected to power source 12 via a fluid passageway 32. Air cooler 28 may embody an air-to-air heat exchanger, an air-to-liquid heat exchanger, or a combination of both, and be configured to facilitate the transfer of thermal energy to or from the compressed air directed into power source 12. Air cooler 28 may be disposed within fluid passageway 32, between compressors 26 or between power source 12 and compressors 26.

Exhaust system 16 may include components configured to direct exhaust from power source 12 to the atmosphere. Specifically, exhaust system 16 may include first and second exhaust manifolds 34 and 36 in communication with combustion chambers 22, an exhaust gas recirculation (EGR) circuit 38 fluidly communicating first exhaust manifold 34 with air induction system 14, first and second turbines 40 and 42 associated with first and second exhaust manifolds 34, 36, and a control system 44 for regulating flows from exhaust system 16 to air induction system 14. It is contemplated that exhaust system 16 may include components in addition to those listed above such as, for example, particulate traps, constituent absorbers or reducers, and attenuation devices.

The exhaust produced during the combustion process within combustion chambers 22 may exit power source 12 via either first exhaust manifold 34 or second exhaust manifold 36. First exhaust manifold 34 may fluidly connect a first plurality of combustion chambers 22 of power source 12 (e.g., the first three combustion chambers 22 from the right shown in FIG. 1) to first turbine 40. Second exhaust manifold 36 may fluidly connect a second plurality of combustion chambers 22 of power source 12 (e.g., the final three combustion chambers from the right shown in FIG. 1) to first turbine 40.

EGR circuit 38 may include components that cooperate to redirect a portion of the exhaust produced by power source 12 from first exhaust manifold 34 to air induction system 14. Specifically, EGR circuit 38 may include an inlet port 52, an EGR cooler 54, a recirculation control valve 56, and a discharge port 58. Inlet port 52 may be fluidly connected to first exhaust manifold 34 upstream of first turbine 40 and fluidly connected to EGR cooler 54 via a fluid passageway 60. Discharge port 58 may receive exhaust from EGR cooler 54 via a fluid passageway 62, and discharge the exhaust to air induction system 14 at a location downstream of air cooler 28. Recirculation control valve 56 may be disposed within fluid passageway 62, between EGR cooler 54 and discharge port 58. It is further contemplated that a check valve, for example a reed-type check valve 50 may be situated within fluid passageway 62 upstream or downstream of recirculation control valve 56 at a location where exhaust mixes with inlet air to provide for a unidirectional flow of exhaust through EGR circuit 38 (i.e., to inhibit bidirectional exhaust flows through EGR circuit 38), if desired.

Recirculation control valve 56 may be located to control the flow of exhaust recirculated through EGR circuit 38. Recirculation control valve 56 may be any type of valve known in the art such as, for example, a butterfly valve, a diaphragm valve, a gate valve, a ball valve, a poppet valve, or a globe valve. In addition, recirculation control valve 56 may be solenoid-actuated, hydraulically-actuated, pneumatically-actuated or actuated in any other manner to selectively restrict or completely block the flow of exhaust through fluid passageways 60 and 62.

EGR cooler 54 may be configured to cool exhaust flowing through EGR circuit 38. EGR cooler 54 may include a liquid-to-air heat exchanger, an air-to-air heat exchanger, or any other type of heat exchanger known in the art for cooling an exhaust flow.

Figure 2:
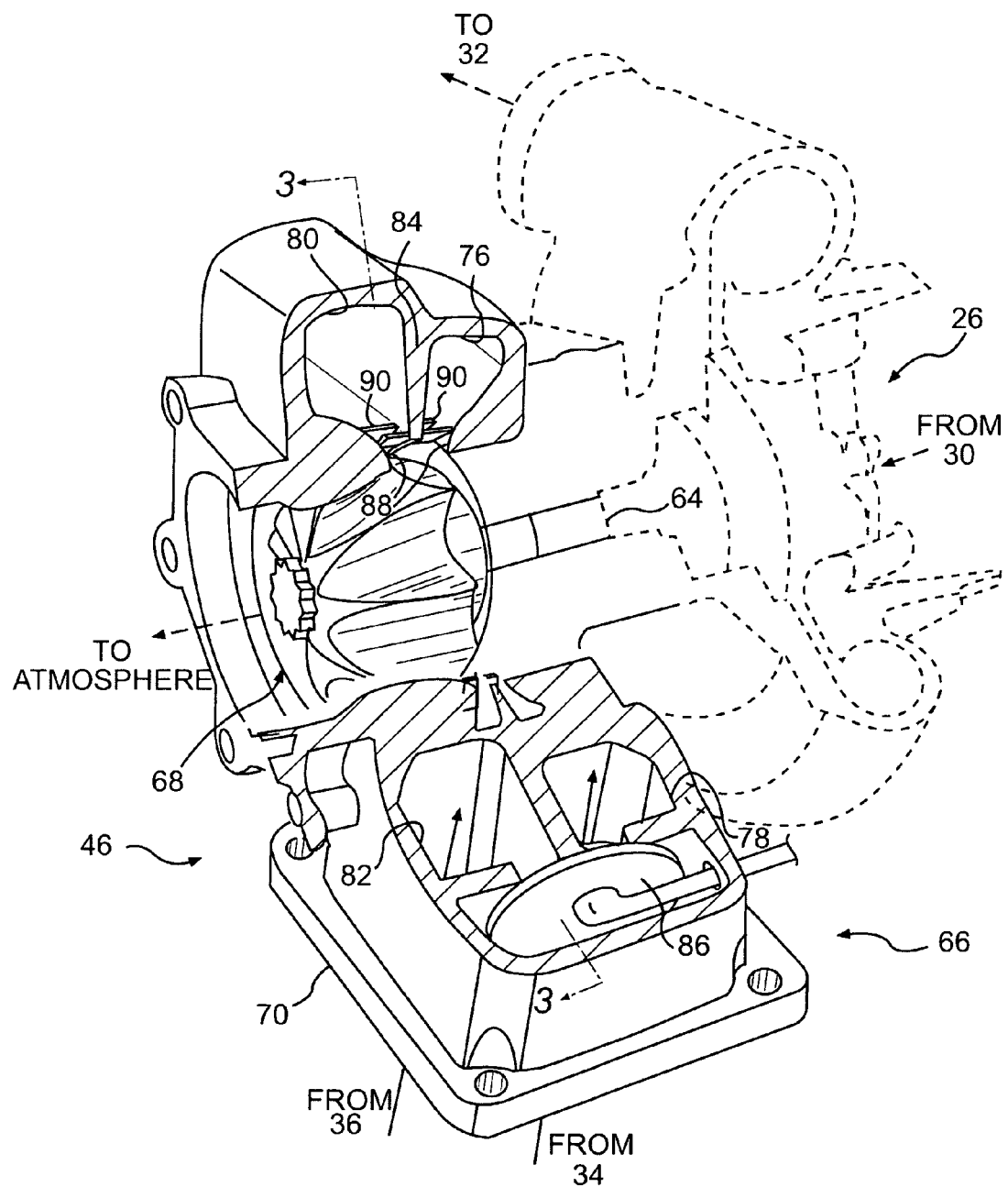
FIG. 2 is a pictorial illustration of an exemplary disclosed turbocharger that may be used with the power system of FIG. 1.

First turbine 40 may be configured to drive one or more of compressors 26. For example, first turbine 40 may be directly and mechanically connected to one of compressors 26 by way of a shaft 64 to form a turbocharger 66. As the hot exhaust gases exiting power source 12 move through first turbine 40 and expand against blades (not shown in FIG. 1) therein, first turbine 40 may rotate and drive the connected compressor 26 to pressurize inlet air. As illustrated in FIG. 2, first turbine 40 may include a turbine wheel 68 fixedly connected to shaft 64 and centrally disposed to rotate within a turbine housing 70.

Turbine housing 70 may be configured to at least partially enclose turbine wheel 68 and direct hot expanding gases from first and second exhaust manifolds 34, 36 separately to turbine wheel 68. In particular, turbine housing 70 may be a divided housing having a first volute 76 with a first inlet 78 fluidly connected with first exhaust manifold 34, and a second volute 80 with a second inlet 82 fluidly connected with second exhaust manifold 36 (i.e., turbocharger 66 may have dual volutes). A wall member 84 may divide first volute 76 from second volute 80. It should be understood that at least a part of first volute 76 and/or first inlet 78 may have a smaller cross-sectional area or area/radius (A/R) ratio than second volute 80 and/or second inlet 82. The smaller cross-sectional area or A/R may help restrict the flow of exhaust through first exhaust manifold 34, thereby creating backpressure sufficient to direct at least a portion of the exhaust from first exhaust manifold 34 through EGR circuit 38.

A balance valve 86 may be mounted integrally within or connected to turbine housing 70 and fluidly communicated with both first and second volutes 76, 80. Balance valve 86 may be configured to regulate the pressure of exhaust flowing through first exhaust manifold 34 by selectively allowing exhaust to flow from first volute 76 to the second volute 80. It should be understood that the pressure in first exhaust manifold 34 may affect the amount of exhaust directed through EGR circuit 38. That is, when exhaust flows from first exhaust manifold 34 to second exhaust manifold 36 by way of balance valve 86, a pressure within first exhaust manifold 34 may be reduced and, as a result, an amount of exhaust passing from first exhaust manifold 34 through EGR circuit 38 may be reduced proportionally. It should also be noted that, because exhaust may be selectively allowed to flow from first exhaust manifold 34 to second exhaust manifold 36, a pressure differential between first and second volutes 76 and 80 may be minimized, thereby minimizing an impact the pressure differential may have on the turbocharger efficiency.

Balance valve 86 may be any type of valve such as, for example, a butterfly valve, a diaphragm valve, a gate valve, a ball valve, a poppet valve, a globe valve, or any other valve known in the art. Furthermore, balance valve 86 may be solenoid-actuated, hydraulically-actuated, pneumatically-actuated or actuated in any other manner to selectively restrict or completely block the flow of exhaust between first and second volutes 76, 80.

Each of first and second volutes 76, 80 may have an annular channel-like outlet 88 fluidly connecting first and second volutes 76, 80 with a periphery of turbine wheel 68. A plurality of vane members 90 may be disposed within each of first and second volutes 76, 80 between first and second inlets 78, 82 and annular channel-like outlet 88. Vane members 90 may be angled relative to a central axis of first turbine 40 such that exhaust gases entering first and second inlets 78, 82 and flowing annularly through first and second volutes 76, 80 may be radially and uniformly redirected inward through annular channel-like outlet 88 at a plurality of finite annular locations. In one embodiment where turbocharger 66 is a variable geometry turbocharger, vane members 90 may be selectively oriented to adjust an exhaust flow angle and/or to adjust a flow spacing between adjacent vanes, thereby adjusting a pressure and/or a flow rate of exhaust through first and second volutes 76, 80 and through first and second exhaust manifolds 34, 36, if desired.

Referring back to FIG. 1, second turbine 42 may be connected to one of compressors 26 to form a fixed or variable geometry turbocharger 92. In the depicted arrangement, second turbine 42 may be a single volute turbine situated to receive exhaust from both of first and second volutes 76 and 80 of first turbine 40, and to drive the connected compressor 26. As the hot exhaust gases exiting first turbine 40 move through second turbine 42 and expand against blades (not shown) therein, second turbine 42 may rotate and drive the connected compressor 26 to pressurize inlet air directed into turbocharger 66 for further pressurizing. The single volute of second turbine 42 may have a lower restriction (i.e., a larger flow capacity) than that of either first or second volutes 76, 80 of first turbine 40.

Control system 44 may include components that function to regulate the flow rate and pressure of exhaust flowing though first exhaust manifold 34 and, subsequently the flow rate and pressure of exhaust flowing through EGR circuit 38 by adjusting first turbine 40, recirculation control valve 56, and/or balance valve 86 in response to sensory input. Specifically, control system 44 may include a sensor 46, and a controller 48 in communication with sensor 46, first turbine 40, recirculation control valve 56, and balance valve 86. Based on signals received from sensor 46, controller 48 may adjust the geometry of first turbine 40 or a restriction provided by recirculation control valve 56 and/or balance valve 86.

Although shown as located downstream of EGR cooler 54 and upstream of recirculation control valve 56, sensor 46 may alternatively be located anywhere within EGR circuit 38 and embody, for example, a mass air flow sensor such as a hot wire anemometer or a venturi-type sensor configured to sense pressure and/or a flow rate of exhaust passing through EGR circuit 38. Controller 48 may use signals produced by sensor 46 to determine and/or adjust a backpressure within first exhaust manifold 34 such that a desired amount of exhaust is recirculated back into power source 12 for subsequent combustion. This adjustment of pressure will be further explained in more detail below.

Controller 48 may embody a single or multiple microprocessors, field programmable gate arrays (FPGAs), digital signal processors (DSPs), etc. that include a means for controlling an operation of power system 10 in response to signals received from sensor 46. Numerous commercially available microprocessors can be configured to perform the functions of controller 48. It should be appreciated that controller 48 could readily embody a microprocessor separate from that controlling other non-exhaust related power system functions, or that controller 48 could be integral with a general power system microprocessor and be capable of controlling numerous power system functions and modes of operation. If separate from a general power system microprocessor, controller 48 may communicate with the general power system microprocessor via data links or other methods. Various other known circuits may be associated with controller 48, including power supply circuitry, signal-conditioning circuitry, actuator driver circuitry (i.e., circuitry powering solenoids, motors, or piezo actuators), communication circuitry, and other appropriate circuitry.

Before regulating the flow of exhaust through EGR circuit 38, controller 48 may receive data indicative of an operational condition of power source 12 or a desired exhaust flow rate. Such data may be received from another controller or computer (not shown). In an alternative embodiment, operational condition data may be received from sensors strategically located throughout power system 10. Controller 48 may then utilize stored algorithms, equations, subroutines, look-up maps and/or tables to analyze the operational condition data and determine a corresponding desired exhaust pressure and/or flow rate through EGR circuit 38.

Controller 48 may also receive signals from sensor 46 indicative of the flow rate or pressure of exhaust flowing through first exhaust manifold 34. Upon receiving input signals from sensor 46, controller 48 may perform a plurality of operations utilizing stored algorithms, equations, subroutines, look-up maps and/or tables to determine whether the flow rate or pressure of exhaust flowing through first exhaust manifold 34 is within a desired range for producing the desired exhaust flow rate through EGR circuit 38. In an alternate embodiment, it is contemplated that controller 48 may receive signals from various sensors (not shown) located throughout exhaust system 16 and/or power system 10 instead of sensor 46. Such sensors may sense parameters that may be used to calculate the flow rate or pressure of exhaust flowing through first exhaust manifold 34, if desired.

Based on the comparison of the actual EGR flow rate with the desired range of flow rates, controller 48 may adjust operation of exhaust system 16. That is, controller 48 may adjust the geometry of turbocharger 66, operation of balance valve 86, and/or operation of recirculation control valve 56 to affect the pressure within first exhaust manifold 34 and the resulting flow rate of exhaust through EGR circuit 38. In one embodiment, controller 48 may primarily adjust operation of balance valve 86 to achieve a desired flow rate of exhaust through EGR circuit 38. After balance valve 86 has been adjusted to a maximum or minimum position, controller 48 may then adjust operation of recirculation control valve 56 to provide further exhaust recirculation modulation.

INDUSTRIAL APPLICABILITY

The disclosed exhaust system may be implemented into any power system application where charged air induction and exhaust gas recirculation are utilized. The disclosed exhaust system may be suitable for both high- and low-boost applications, have high power density, and offer control precision. Specifically, the dual-stage turbocharging provided by exhaust system 16 may allow efficient operation in high-boost and high-power density applications, while the variable geometry of turbocharger 66 may allow efficient operation in low-boost applications. In addition, the location of recirculation control valve 56, sensor 46, and check valve 50 downstream of EGR cooler 54 may result in cooler operating temperatures of those components and extended component lives. Further, the use of check valve 50 may enhance EGR flow capability. Finally, by utilizing direct flow sensing and feedback control, precise regulation of exhaust recirculation may be possible.

It will be apparent to those skilled in the art that various modifications and variations can be made to the disclosed exhaust system. Other embodiments will be apparent to those skilled in the art from consideration of the specification and practice of the disclosed exhaust system. It is intended that the specification and examples be considered as exemplary only, with a true scope being indicated by the following claims and their equivalents.

What is claimed is:

1. An exhaust system for an engine, comprising:
   a first exhaust manifold configured to receive exhaust from the engine;
   a second exhaust manifold configured to receive exhaust from the engine in parallel with the first exhaust manifold;
   an exhaust gas recirculation circuit in fluid communication with only the first exhaust manifold;
   a first turbocharger having dual volutes configured to simultaneously receive exhaust from the first exhaust manifold and the second exhaust manifold;
   a second turbocharger configured to receive exhaust from the first turbocharger and receive and compress inlet air directed into the engine;
   a balancing valve associated with the first turbocharger and configured to adjust an amount of exhaust directed through the exhaust gas recirculation circuit;
   a control valve located within the exhaust gas recirculation circuit to regulate a flow of exhaust directed through the exhaust gas recirculation circuit;
   a flow sensor located in the exhaust gas recirculation circuit; and
   a controller in communication with the flow sensor, the control valve, and the balancing valve, the controller being configured to regulate operation of the control valve and the balancing valve in response to input from the flow sensor.

2. The exhaust system of claim 1, wherein the balancing valve is integral with the first turbocharger and configured to selectively-communicate the dual volutes of the first turbocharger.

3. The exhaust system of claim 1, further including a check valve located within the exhaust gas recirculation circuit to provide for a unidirectional flow of exhaust through the exhaust gas recirculation circuit.

4. The exhaust system of claim 3, wherein the check valve is located downstream of the control valve at a location where exhaust mixes with the inlet air.

5. The exhaust system of claim 1, further including a cooler located within the exhaust gas recirculation circuit upstream of the control valve.

6. The exhaust system of claim 1, wherein the flow sensor is located upstream of the control valve.

7. The exhaust system of claim 1, wherein the first turbocharger is asymmetric.

8. The exhaust system of claim 1, wherein the second turbocharger is a single volute turbocharger having a larger flow capacity than either of the dual volutes of the first turbocharger.

9. A method of handling exhaust from an engine, the method comprising:
   receiving exhaust from a first plurality of combustion chambers;
   receiving exhaust from a second plurality of combustion chambers;
   directing a portion of the exhaust received from only the first plurality of combustion chambers back into the engine for subsequent combustion;
   using a first turbocharger to remove energy from a remaining portion of the exhaust received from the first plurality of combustion chambers;
   using the first turbocharger to remove energy from the exhaust received from the second plurality of combustion chambers;
   directing the remaining portion of the exhaust received from the first plurality of combustion chambers to mix with the exhaust received from the second plurality of combustion chambers to form a mixed exhaust;
   using a second turbocharger to remove energy from the mixed exhaust and to receive and pressurize atmospheric air that is directed into the first and second plurality of combustion chambers;
   selectively restricting a flow of the exhaust received from the first plurality of combustion chambers to adjust the portion of the exhaust directed back into the engine for subsequent combustion;
   selectively restricting the portion of the exhaust directed back into the engine for subsequent combustion;
   cooling the portion of the exhaust directed back to the engine for subsequent combustion before it is selectively restricted;
   sensing a flow rate of the portion of the exhaust directed back into the engine for subsequent combustion; and
   adjusting a restriction of the flow of the exhaust received from the first plurality of combustion chambers and the restriction of the portion of the exhaust directed back into the engine for subsequent combustion based on the sensed flow rate.

10. The method of claim 9, further including inhibiting bidirectional flows of the portion of the exhaust directed back into the engine for subsequent combustion.

11. The method of claim 9, wherein the restriction of the flow of exhaust received from the first plurality of combustion chambers is adjusted to a maximum or minimum position when the restriction of the portion of the exhaust directed back into the engine for subsequent combustion is adjusted.

12. The method of claim 9, wherein the flow rate sensing occurs after the portion of the exhaust directed back into the engine for subsequent combustion has been cooled.

13. A power system, comprising:
   a combustion engine having a first plurality of combustion chambers and a second plurality of combustion chambers;
   a first exhaust manifold configured to receive exhaust from the first plurality of combustion chambers;
   a second exhaust manifold configured to receive exhaust from the second plurality of combustion chambers;
   an exhaust gas recirculation circuit fluidly connected to direct exhaust from only the first exhaust manifold back into the combustion engine for subsequent combustion;

a first turbocharger having dual asymmetric volutes configured to receive exhaust from the first exhaust manifold and the second exhaust manifold;

a second turbocharger configured to receive exhaust from the first turbocharger;

a balancing valve associated with the dual asymmetric volutes of the first turbocharger and being configured to adjust an amount of exhaust directed through the exhaust gas recirculation circuit;

an exhaust gas recirculation control valve located within the exhaust gas recirculation circuit to regulate a flow of exhaust directed through the exhaust gas recirculation circuit;

a flow sensor located in the exhaust gas recirculation circuit; and a controller in communication with the flow sensor and the balancing valve, the controller being configured to regulate operation of the balancing valve in response to input from the flow sensor.

14. The power system of claim 13, wherein the flow sensor measures the flow of exhaust directed through the exhaust gas recirculation circuit upstream from the exhaust gas recirculation control valve.

15. The power system of claim 13, wherein the second turbocharger is further configured to compress inlet air directed into the combustion engine.

16. The power system of claim 13, wherein the dual asymmetric volutes include a first volute and a second volute, and the balancing valve is further configured to adjust a flow of the exhaust from the first volute to the second volute.

* * * * *